(12) United States Patent
Shi et al.

(10) Patent No.: US 10,081,064 B2
(45) Date of Patent: *Sep. 25, 2018

(54) EXPANDING LOCATING AND CLAMPING PIN

(71) Applicant: GM GLOBAL TECHNOLOGY OPERATIONS LLC, Detroit, MI (US)

(72) Inventors: Jianying Shi, Oakland Township, MI (US); Scott A. McLeod, Windsor (CA); Justin Jay Hackett, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 369 days.

This patent is subject to a terminal disclaimer.

(21) Appl. No.: 14/830,291

(22) Filed: Aug. 19, 2015

(65) Prior Publication Data

US 2017/0050246 A1   Feb. 23, 2017

(51) Int. Cl.
*B23B 31/40* (2006.01)
*B23B 31/16* (2006.01)
(Continued)

(52) U.S. Cl.
CPC .......... *B23B 31/40* (2013.01); *B23B 31/1612* (2013.01); *B25B 5/087* (2013.01);
(Continued)

(58) Field of Classification Search
CPC ... B23B 31/40; B23Q 3/18; B23Q 3/08; B25J 15/10; B25J 15/103; B25J 15/0047
See application file for complete search history.

(56) References Cited

U.S. PATENT DOCUMENTS 2,503,426 A * 4/1950 Tower ............... B25B 27/02
                                                173/131
3,514,116 A * 5/1970 Brinkman ........... B23B 31/4006
                                                279/131

(Continued)

FOREIGN PATENT DOCUMENTS

| CN | 1962117 A | 5/2007 |
|---|---|---|
| CN | 103659007 A | 3/2014 |
| EP | 2025293 A1 | 2/2009 |

OTHER PUBLICATIONS

Goudsmit Magnetic Systems, brochure entitled "Magnet Grippers"; accessed Aug. 14, 2014; 4 pages.

*Primary Examiner* — Christopher M Koehler
*Assistant Examiner* — Seahee Yoon
(74) *Attorney, Agent, or Firm* — Quinn IP Law

(57) ABSTRACT

An expanding locating and clamping pin assembly configured to locate and clamp a part includes a housing, a locating pin, an actuating mechanism, and a controller. The housing is configured with a plurality of radial jaw guides and a part rest face. The locating pin has a plurality of jaws radially movable in the radial jaw guides, extending past the part rest face, and configured with a part clamping feature. The actuating mechanism is connected to the housing and the jaws and is configured to synchronously move the jaws to a radial position and to apply the clamping force. The controller controls the radial position of the jaws and the clamping force. The part rest face and the jaws of the locating pin are configured to receive the part in a located position and to clamp the part in the located position via the clamping force.

16 Claims, 4 Drawing Sheets

(51) Int. Cl.
  *B25B 5/08* (2006.01)
  *B25B 31/00* (2006.01)
  *B23B 31/12* (2006.01)
  *B25J 15/10* (2006.01)
  *G11B 17/028* (2006.01)
  *B23B 31/171* (2006.01)

(52) U.S. Cl.
  CPC ........ *B25B 31/005* (2013.01); *B23B 31/1253* (2013.01); *B25J 15/10* (2013.01); *G11B 17/0282* (2013.01)

(56) References Cited

U.S. PATENT DOCUMENTS

| | | | | |
|---|---|---|---|---|
| 4,562,570 | A * | 12/1985 | Denton | G11B 17/0284 720/709 |
| 4,627,288 | A * | 12/1986 | Guzik | G11B 17/0287 360/99.06 |
| 5,195,794 | A * | 3/1993 | Hummel, Jr. | B65G 47/90 294/94 |
| 5,323,379 | A * | 6/1994 | Kim | G11B 17/0282 369/264 |
| 6,494,516 | B1 * | 12/2002 | Bertini | B23P 19/084 294/119.1 |
| 6,848,113 | B2 * | 1/2005 | Klein | G11B 17/08 369/30.55 |
| 7,254,822 | B2 * | 8/2007 | Chiu | G11B 17/0282 720/707 |
| 2005/0040578 | A1 * | 2/2005 | Sawdon | B25B 5/062 269/32 |
| 2006/0097462 | A1 * | 5/2006 | Moilanen | B25J 15/028 279/2.11 |
| 2007/0271753 | A1 * | 11/2007 | Haag | B23B 31/16241 29/235 |
| 2010/0252610 | A1 * | 10/2010 | Viola | A61B 17/07207 227/177.1 |
| 2011/0089709 | A1 * | 4/2011 | Neeper | B25J 9/102 294/119.1 |
| 2013/0106127 | A1 | 5/2013 | Lipson et al. | |
| 2013/0309057 | A1 * | 11/2013 | Yasuda | B25J 15/08 414/729 |
| 2013/0336755 | A1 * | 12/2013 | Neeper | B25J 9/102 414/800 |
| 2014/0138971 | A1 * | 5/2014 | Xie | B25J 15/0047 294/195 |
| 2015/0336277 | A1 * | 11/2015 | Schanz | B25J 15/0047 294/97 |
| 2016/0278872 | A1 * | 9/2016 | Gombert | B25J 15/028 |
| 2017/0050245 | A1 * | 2/2017 | Shi | B23B 31/40 |

* cited by examiner

EXPANDING LOCATING AND CLAMPING PIN

TECHNICAL FIELD

This disclosure relates to an expanding locating pin with controlled clamping force.

BACKGROUND

A manufacturing system typically operates on parts, subassemblies, and/or assemblies that must be accurately located and securely clamped in place for manufacturing and assembly operations. For example, a sheet metal part, subassembly, or assembly may need to be accurately located and securely clamped in place to conduct assembly, welding, and inspection operations in the body shop of a vehicle assembly plant.

Part locating fixtures are normally used for this purpose. Part locating fixtures typically include a plurality of fixed pins that are configured to fit into a plurality of locating holes in the part and one or more clamps that are configured to clamp the part in place. Part locating fixtures are generally useable for only one particular part size and/or shape and usually need to be modified or rebuilt to locate and clamp a differently sized and/or shaped part. Multiple part locating fixtures are typically required for the wide variety of parts and the wide variety of assembly and manufacturing operations in a manufacturing plant.

SUMMARY

An expanding locating and clamping pin assembly and a flexible manufacturing system are provided herein. The expanding locating and clamping pin assembly is configured to locate a part with locating holes of various sizes and to clamp the part with a controlled clamping force. The expanding locating and clamping pin assembly includes a housing, a locating pin, an actuating mechanism, and a controller. The housing is configured with a plurality of radial jaw guides and a part rest face. The locating pin has a plurality of jaws, each connected to and radially movable in one of the radial jaw guides, extending from the part rest face, and configured with a part clamping feature. The actuating mechanism is connected to the housing and the jaws and is configured to synchronously move the jaws to a radial position and to apply the clamping force. The controller is connected to the actuating mechanism and is configured to control the radial position of the jaws and the clamping force. The part rest face and the jaws of the locating pin are configured to receive the part in a located position. The part rest face and the part clamping features of the jaws of the locating pin are configured to clamp the part in the located position via the clamping force. The housing may be configured with three jaw guides, and the locating pin may have three jaws.

The flexible manufacturing system is for manufacturing one or more of a part, a subassembly, and an assembly each having various configurations and locating holes of various sizes. The flexible manufacturing system includes an expanding locating and clamping pin assembly configured to locate and clamp one of the part, the subassembly, and the assembly in a located position. The expanding locating and clamping pin assembly includes a housing, a locating pin, and actuating mechanism, and a controller. The housing is configured with a plurality of radial jaw guides and a part rest face. The locating pin has a plurality of jaws, each connected to and radially movable in one of the radial jaw guides, extending from the part rest face, and configured with a part clamping feature. The actuating mechanism is connected to the housing and the jaws and is configured to synchronously move the jaws to a radial position and to apply the clamping force. The controller is connected to the actuating mechanism and is configured to control the radial position of the jaws and the clamping force. The part rest face and the jaws of the locating pin are configured to receive the one of the part, the subassembly, and the assembly in the located position. The part rest face and the part clamping features of the jaws of the locating pin are configured to clamp the one of the part, the subassembly, and the assembly in the located position via the clamping force. The housing may be configured with three jaw guides, and the locating pin may have three jaws.

The expanding locating and clamping pin assembly and the flexible manufacturing system enable parts, subassemblies, and/or assemblies having various configurations and locating holes of various sizes to be located and clamped in place for manufacturing and assembly operations. This disclosure applies to any machine or manufacture that locates and clamps any item, including but not limited to parts, subassemblies, assemblies, for any purpose. This disclosure applies to any manufacturing system, including but not limited to manufacturing systems for vehicles and other transportation products, industrial products, construction products, consumer products, and government products.

The above features and advantages and other features and advantages of the present teachings are readily apparent from the following detailed description of the best modes for carrying out the present teachings when taken in connection with the accompanying drawings.

DETAILED DESCRIPTION

Figures 1A, 1B:
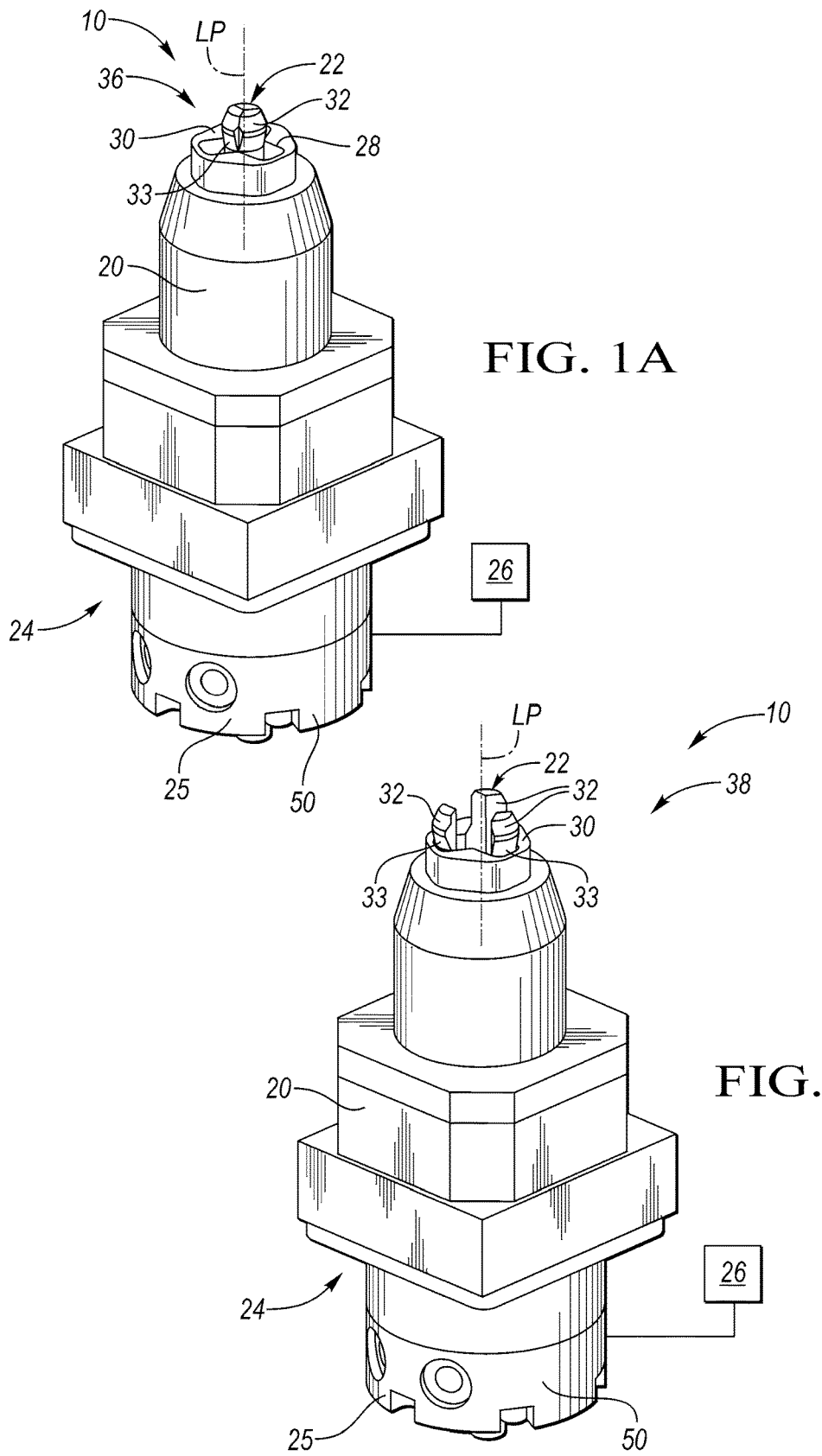
FIG. 1A is a schematic perspective illustration of an expanding locating and clamping pin assembly with a plurality of jaws at a minimum diameter radial position.
FIG. 1B is a schematic perspective illustration of the expanding locating and clamping pin assembly of FIG. 1A with the plurality of jaws at a maximum diameter radial position.
Figure 2:
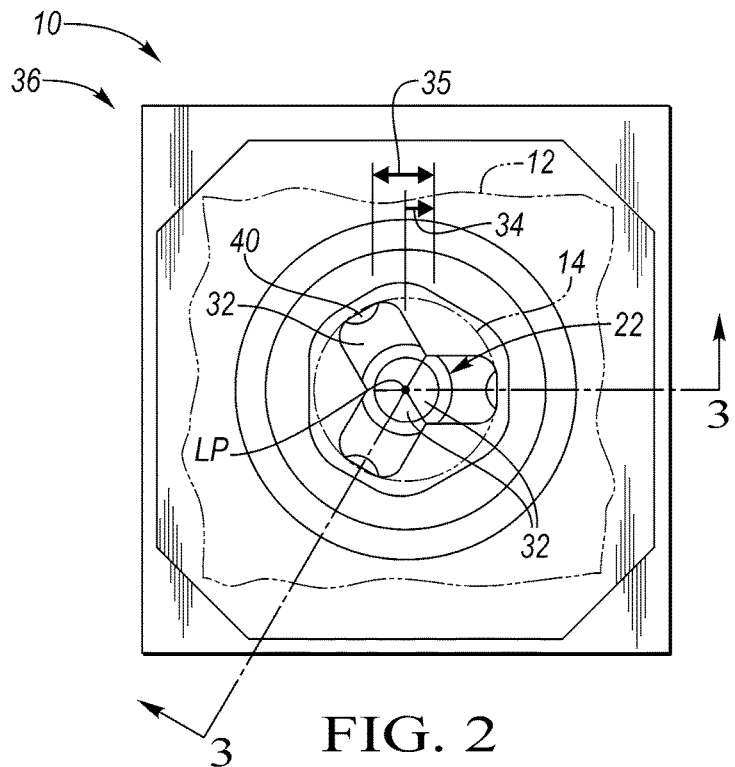
FIG. 2 is a schematic top view illustration of the expanding locating and clamping pin assembly of FIG. 1A with a part that is in a located position.

Referring to the drawings, wherein like reference numbers refer to like components throughout the views, FIG. 1A-1B shows an expanding locating and clamping pin assembly 10 for use in a flexible manufacturing system (not shown). The flexible manufacturing system is for manufacturing and/or assembling one or more of a part, subassembly, or assembly 12, as best shown in FIGS. 2-4, each having various size and shape configurations and each configured with one or more locating holes 14 of various sizes. The locating holes 14 have an edge 18. The part, subassembly, or assembly 12 has a locating surface 15 and an outer surface 17. The part 12 may need to be accurately located and clamped in place for manufacturing and assembly operations. For example, a sheet metal part, subassembly, or assembly 12 may need to be accurately located and clamped in place to conduct assembly, welding, and inspection operations in the body shop of a vehicle assembly plant.

Figures 3A, 3B:
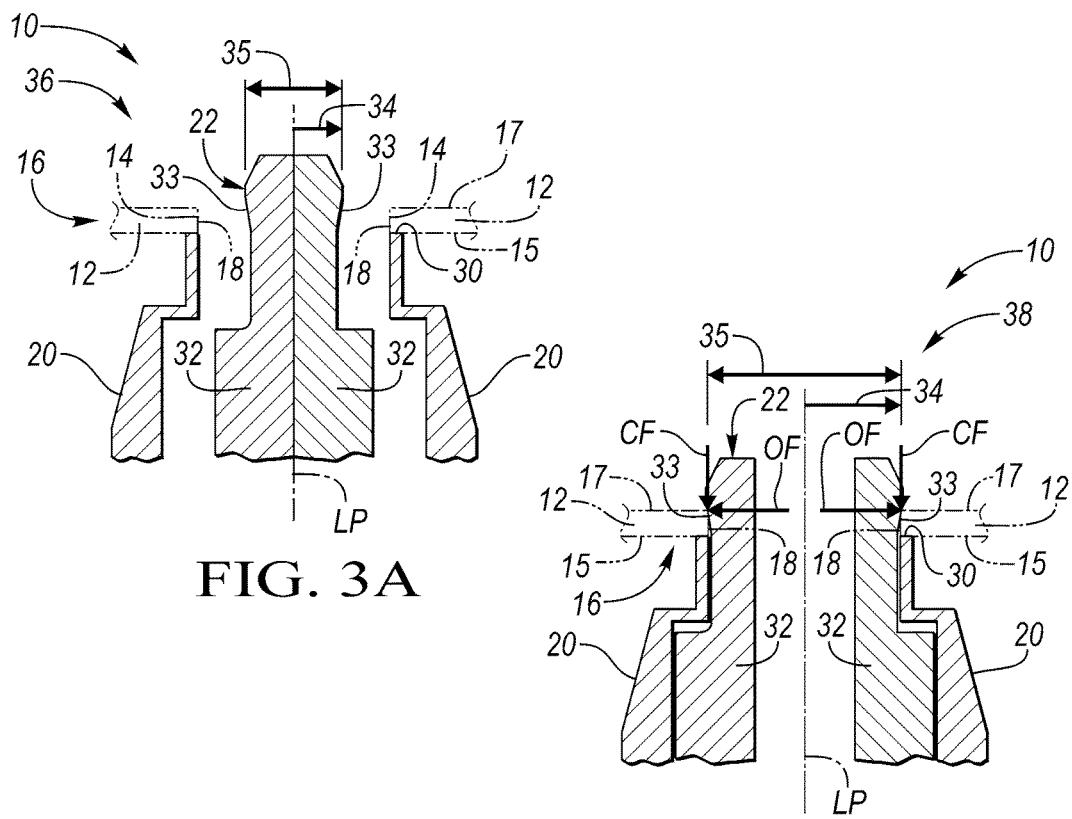
FIG. 3A is a fragmentary schematic cross-sectional illustration of the expanding locating and clamping pin assembly of FIG. 1A, taken at line 3-3 of FIG. 2, with the plurality of jaws at the minimum diameter radial position.
FIG. 3B is a fragmentary schematic cross-sectional illustration of the expanding locating and clamping pin assembly of FIG. 1A, taken at line 3-3 of FIG. 2, with the plurality of jaws at the maximum diameter radial position.
Figure 4:
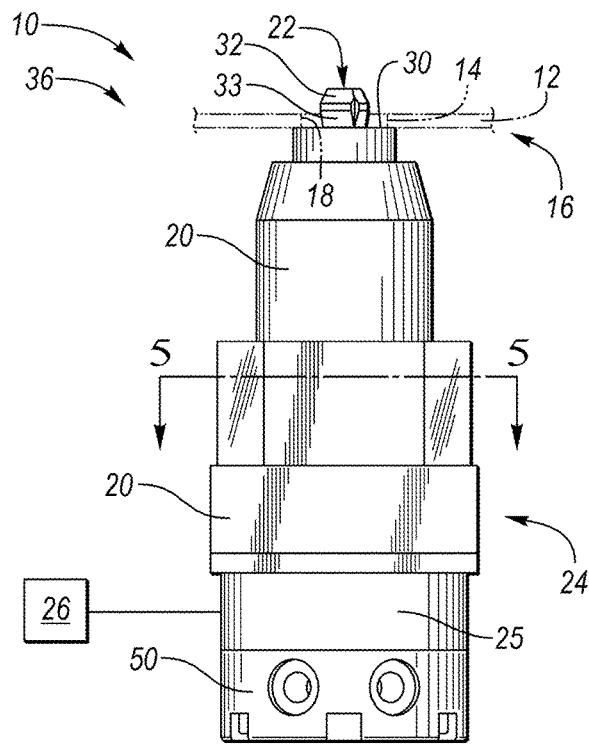
FIG. 4 is a schematic side view illustration of the expanding locating and clamping pin assembly of FIG. 1A with the jaws in the minimum diameter radial position and the part in the located position.

Referring now to FIGS. 2-3B, the expanding locating and clamping pin assembly 10 is configured to locate the part 12 via the locating hole 14 and the locating surface 15 in a located position 16, as best seen in FIG. 3B. The expanding locating and clamping pin assembly 10 is also configured to clamp the part 12 with a controlled clamping force (arrow CF) in the located position 16. Locating is defined herein as positioning the part 12 in the located position 16 in 3-dimensional space. Clamping is defined herein as compressing the part 12 between two surfaces with the clamping force (arrow CF) such that movement of the part 12 is prevented by the clamping force (arrow CF) and by the interference of the two surfaces with the object.

The expanding locating and clamping pin assembly 10 may be connected to an immovable structure (not shown), or to a moveable device (not shown), including but not limited to a robot, a conveyor, and a guided vehicle. There may be multiple expanding locating and clamping pin assemblies 10 included in the flexible manufacturing system and/or in a particular manufacturing or assembly operation in the flexible manufacturing system.

Referring again to FIGS. 1A-1B, the expanding locating and clamping pin assembly 10 includes a housing 20, a locating pin 22, an actuating mechanism 24, and a controller 26. The housing 20 is configured with a plurality of radial jaw guides 28 and a part rest face 30.

The locating pin 22 has a plurality of jaws 32. Each jaw 32 is connected to and radially movable in one of the radial jaw guides 28 and extends out of the housing 20 past the rest face 30. The locating pin 22 has a locating pin axis (axis LP) at its center of symmetry. Each of the jaws 32 has a part clamping feature 33. The part clamping feature 33 of the jaws 32 may be a surface that angles outward from the locating pin axis (axis LP) as the distance from the part rest face 30 increases, as shown. The part clamping feature 33 of the jaws 32 may be a segment of a frusto conical surface that angles outward from the locating pin axis (axis LP) as the distance from the part rest face 30 increases, as shown. The part clamping feature 33 of the jaws 32 may be any other suitable feature for applying the clamping force (arrow CF) perpendicular to the outer surface 17 of the part 12 at or near the edge 18 of the locating hole 14, as best seen in FIG. 3B.

Referring again to FIGS. 1A-1B, the housing 20 may be configured with three radial jaw guides 28 and the locating pin 22 may have three jaws 32 configured to locate and clamp the part 12 when the locating hole 14 is a round hole, as shown. Alternatively, the housing 20 may be configured with two radial jaw guides 28 and the locating pin 22 may have two jaws 32 configured to locate and clamp the part 12 when the locating hole 14 is a slot (not shown).

The actuating mechanism 24 is connected to the housing 20 and the jaws 32. The actuating mechanism 24 is configured to synchronously move the jaws 32 to a radial position 34 defining a locating pin diameter 35 and to apply the clamping force (arrow CF) normal to the edge 18 of the locating hole 14 of the part 12. Radial is defined herein as the direction perpendicular to the locating pin axis (axis LP). The actuating mechanism includes an actuator 25. The actuator 25 may be an electric servo motor 50, as shown. Alternatively, the actuator 25 may be one of a pneumatic actuator, a hydraulic actuator, or any other suitable actuator.

The controller 26 is connected to the actuating mechanism 24 and is configured to control the motion and the radial position 34 of the jaws 32 and to control the clamping force (arrow CF). The magnitude of the clamping force (arrow CF) may be controlled as appropriate depending on a variety of factors, including but not limited to the material type, the material thickness, the size, and the shape of the part 12.

Referring now specifically to FIG. 3B, the part 12 is located in the located position 16 on the part rest face 30 and the jaws 32 of the locating pin 22. The locating surface 15 of the part 12 is in contact with the part rest face 30 of the housing 20 when the part 12 is in the located position 16. In addition, the part clamping features 33 of the jaws 32 are in close proximity to the edge 18 of the locating hole 14 when the part 12 is in the located position 16. For example, the part clamping features 33 of the jaws 32 may be within 1 mm of the edge 18 of the locating hole 14 when the part 12 I in the located position 16. The part 12 may be clamped by further expanding the jaws 32 of the expanding locating and clamping pin assembly 10 to apply the clamping force (arrow CF) after the part 12 is in the located position 16 such that the clamping force (arrow CF) compresses the part 12 between the clamping features 33 of the jaws 32 and the part rest face 30 and movement of the part 12 is prevented by the clamping force (arrow CF) and by the interference of the clamping features 33 of the jaws 32 and the part rest face 30 with the part 12. The jaws 32 may also apply an outward force (arrow OF) normal to and on the edge 18 of the locating hole 14 of the part 12.

Referring again to FIGS. 1A-3B, the jaws 32 of the locating pin 22 may radially moveable from a minimum diameter radial position 36 to a maximum diameter radial position 38. The jaws 32 of the locating pin 22 may be radially moveable to locate and clamp parts 12 having locating holes 14 ranging from 6 mm in diameter at the minimum diameter radial position 36 to 20 mm in diameter at the maximum diameter radial position 38. Alternatively, the jaws 32 of the locating pin 22 may be radially moveable to locate and clamp parts 12 having locating holes 14 ranging from 20 mm in diameter at the minimum diameter radial position 36 to 40 mm in diameter at the maximum diameter radial position 38. The jaws 32 of the locating pin 22 may be radially movable to locate and clamp parts 12 having locating holes 14 of any other appropriate range of diameters, for example 16 mm to 32 mm or 6 mm to 40 mm.

Figures 5A, 5B:
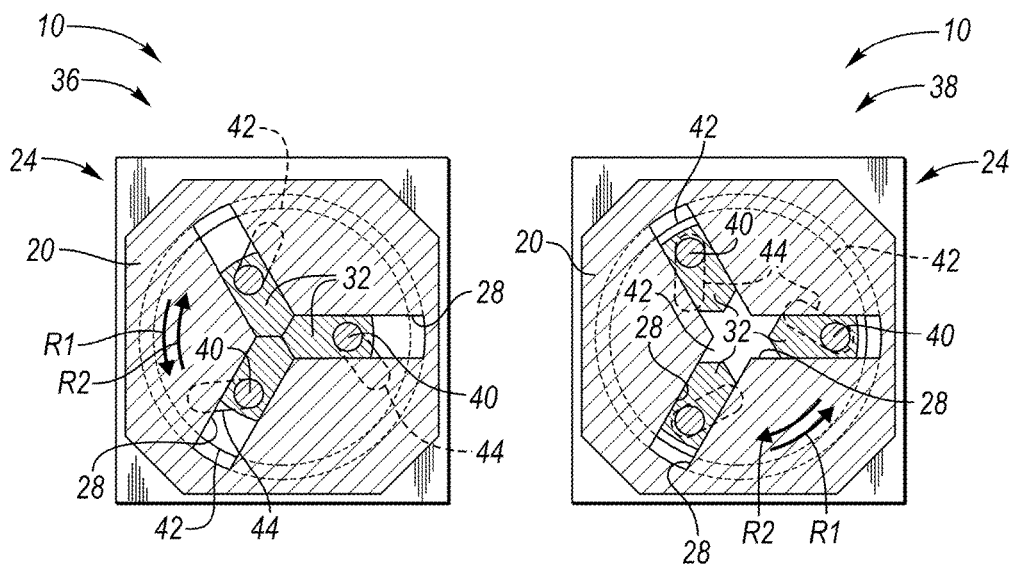
FIG. 5A is a schematic cross-sectional illustration, partially in elevation, of the expanding locating and clamping pin assembly of FIG. 1A, taken at line 5-5 of FIG. 4, with the plurality of jaws at the minimum diameter radial position.
FIG. 5B is a schematic cross-sectional illustration, partially in elevation, of the expanding locating and clamping pin assembly of FIG. 1A, taken at line 5-5 of FIG. 4, with the plurality of jaws at the maximum diameter radial position.

Referring now to FIGS. 5A-5B, each jaw 32 may include a jaw positioning pin 40. The actuating mechanism 24 may include a rotating plate 42 configured with a respective jaw positioning slot 44 extending both radially and circumferentially for each jaw positioning pin 40. Each jaw positioning pin 40 may be connected to the respective jaw positioning slot 44 such that rotating the rotating plate 42 in a first rotation direction (arrow R1) increases the radial position 34 of the jaws 32 and to applies the clamping force (arrow CF) and rotating the rotating plate 42 in a second rotation direction (arrow R2), opposite the first rotation direction (arrow R1), decreases the radial position 34 of the jaws 32 and releases the clamping force (arrow CF).

Referring now to FIGS. 3B-5B, the actuator 25 may have an output shaft (not shown) attached to the rotating plate 42. The actuator 25 may cause the rotating plate 42 to rotate in the first rotation direction (arrow R1) to increase the radial position 34 of the jaws 32 and to apply the clamping force (arrow CF) and in the second rotation direction (arrow R2), opposite the first rotation direction (arrow R1), to decrease the radial position 34 of the jaws 32 and to release the clamping force (arrow CF).

Figure 6:
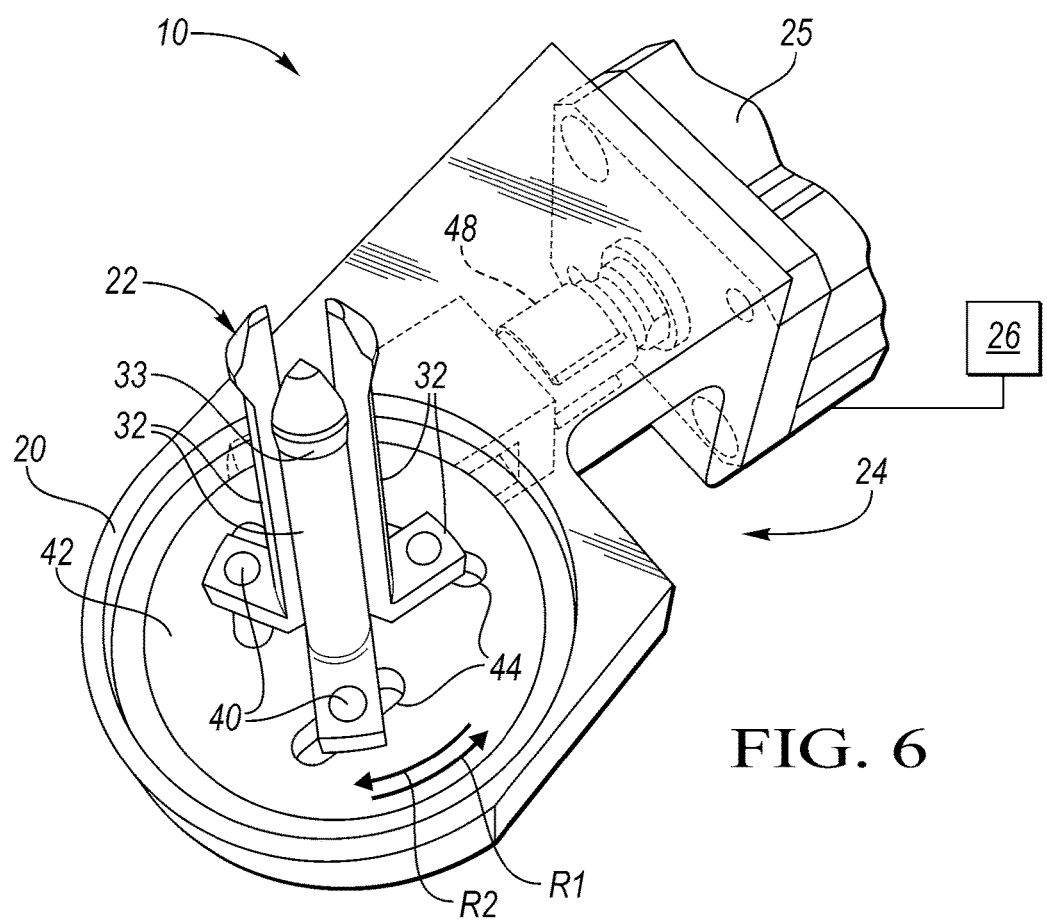
FIG. 6 is a fragmentary schematic perspective view illustration of an alternative embodiment of the expanding locating pin of FIG. 1A with an upper portion of a housing removed for clarity.

Referring now to FIG. 6, the actuating mechanism 24 may include a crank arm (not shown) connected to the rotating plate 42 and a connecting rod 48 connected to the crank arm 46 and to the actuator 25. The actuator 25 via the connecting rod and the crank arm may cause the rotating plate 42 to rotate in the first rotation direction (arrow R1) to increase the radial position 34 of the jaws 32 and to apply the clamping force (arrow CF) and in the second rotation direction (arrow R2), opposite the first rotation direction (arrow R1), to decrease the radial position 34 of the jaws 32 and to release the clamping force (arrow CF).

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An expanding locating and clamping pin assembly configured to receive and locate a part with locating holes of various sizes and to clamp the part with a controlled clamping force, comprising:
   a housing configured with a plurality of radial jaw guides and a part rest face;
   a locating pin having a locating pin axis and having a plurality of jaws, each jaw connected to and radially movable in one of the radial jaw guides, extending past the part rest face in a direction parallel to the locating pin axis, and including a part clamping surface at its radial outer edge that angles outward from the locating pin axis as the distance from the part rest face increases;
   an actuating mechanism connected to the housing and the jaws and configured to synchronously move the jaws to a radial position and to apply a controlled clamping force; and
   a controller connected to the actuating mechanism and configured to control the radial position of the jaws and the clamping force;
   wherein the part rest face of the housing and the part clamping surfaces of the jaws are configured to receive and locate the part via one of the locating holes in a located position;
   wherein the part rest face of the housing and the part clamping surfaces of the jaws are further configured to clamp the part in the located position via the clamping force;
   wherein the angle outward of the clamping surface of the jaws from the locating pin axis is constant;
   wherein each jaw includes a jaw positioning pin;
   wherein the actuating mechanism includes a rotating plate configured with a respective jaw positioning slot extending both radially and circumferentially for each jaw positioning pin; and
   wherein each jaw positioning pin is connected to the respective jaw positioning slot such that rotating the rotating plate moves the jaws of the locating pin in the radial jaw guides to the radial position and applies the clamping force.

2. The expanding locating and clamping pin assembly of claim 1, wherein the jaws of the locating pin are radially moveable to locate and clamp the part with locating holes ranging from 6 mm to 20 mm in diameter.

3. The expanding locating and clamping pin assembly of claim 1, wherein the jaws of the locating pin are radially moveable to locate and clamp the part with locating holes ranging from 20 mm to 40 mm in diameter.

4. The expanding locating and clamping pin assembly of claim 1, wherein the housing is configured with three of the jaw guides; and
   wherein the locating pin has three of the jaws.

5. The expanding locating and clamping pin assembly of claim 1, wherein the actuating mechanism includes a crank arm and a connecting rod.

6. The expanding locating and clamping pin assembly of claim 1, wherein the actuating mechanism includes a pneumatic actuator.

7. The expanding locating and clamping pin assembly of claim 1, wherein the actuating mechanism includes an electric servo motor.

8. The expanding locating and clamping pin assembly of claim 1, wherein the part clamping surface of each jaw is a segment of a frusto conical surface that angles outward from the locating pin axis as the distance from the part rest face increases.

9. A flexible manufacturing system for manufacturing one or more of a part, a subassembly, and an assembly each having various configurations and locating holes of various sizes, comprising:
   an expanding locating and clamping pin assembly configured to receive, locate, and clamp one of the part, the subassembly, and the assembly in a located position, including:
   a housing configured with a plurality of radial jaw guides and a part rest face;
   a locating pin having a locating pin axis and having a plurality of jaws, each jaw connected to and radially movable in one of the radial jaw guides, extending past the part rest face in a direction parallel to the locating pin axis, and including a part clamping surface at its radial outer edge that angles outward from the locating pin axis as the distance from the part rest face increases;
   an actuating mechanism connected to the housing and the jaws and configured to synchronously move the jaws to a radial position and to apply a controlled clamping force; and
   a controller connected to the actuating mechanism and configured to control the radial position of the jaws and the clamping force;

wherein the part rest face of the housing and the part clamping surfaces of the jaws are configured to receive and locate the one of the part, the subassembly, and the assembly via one of the locating holes in the located position;

wherein the part rest face of the housing and the part clamping surfaces of the jaws are further configured to clamp the one of the part, the subassembly, and the assembly in the located position via the clamping force;

wherein the angle outward of the clamping surface of the jaws from the locating pin axis is constant;

wherein each jaw includes a jaw positioning pin;

wherein the actuating mechanism includes a rotating plate configured with a respective jaw positioning slot extending both radially and circumferentially for each jaw positioning pin; and wherein each jaw positioning pin is connected to the respective jaw positioning slot such that rotating the rotating plate moves the jaws of the locating pin in the radial jaw guides to the radial position and applies the clamping force.

10. The flexible manufacturing system of claim 9, wherein the jaws of the locating pin are radially moveable to locate and clamp the one of the part, the subassembly, and the assembly with locating holes ranging from 6 mm to 20 mm in diameter.

11. The flexible manufacturing system of claim 9, wherein the jaws of the locating pin are radially moveable to locate and clamp the one of the part, the subassembly, and the assembly with locating holes ranging from 20 mm to 40 mm in diameter.

12. The flexible manufacturing system of claim 9, wherein the housing is configured with three of the jaw guides; and wherein the locating pin has three of the jaws.

13. The flexible manufacturing system of claim 9, wherein the actuating mechanism includes a crank arm and a connecting rod.

14. The flexible manufacturing system of claim 9, wherein the actuating mechanism includes a pneumatic actuator.

15. The flexible manufacturing system of claim 9, wherein the actuating mechanism includes an electric servo motor.

16. The flexible manufacturing system of claim 9, wherein the part clamping surface of each jaw is a segment of a frusto conical surface that angles outward from the locating pin axis as the distance from the part rest face increases.

* * * * *